United States Patent
Priller

(10) Patent No.: US 9,937,930 B2
(45) Date of Patent: Apr. 10, 2018

(54) VIRTUAL TEST OPTIMIZATION FOR DRIVER ASSISTANCE SYSTEMS

(71) Applicant: AVL LIST GMBH, Graz (AT)

(72) Inventor: Peter Priller, Gratwein-Strassengel (AT)

(73) Assignee: AVL List GmbH, Graz (AT)

( * ) Notice: Subject to any disclaimer, the term of this patent is extended or adjusted under 35 U.S.C. 154(b) by 36 days.

(21) Appl. No.: 15/034,645

(22) PCT Filed: Nov. 5, 2014

(86) PCT No.: PCT/EP2014/073797
§ 371 (c)(1),
(2) Date: May 5, 2016

(87) PCT Pub. No.: WO2015/067649
PCT Pub. Date: May 14, 2015

(65) Prior Publication Data
US 2016/0280233 A1 Sep. 29, 2016

(30) Foreign Application Priority Data

Nov. 5, 2013 (AT) .............. A 50729/2013

(51) Int. Cl.
*B60W 50/04* (2006.01)
*G05B 17/02* (2006.01)
*G05B 23/02* (2006.01)

(52) U.S. Cl.
CPC .......... *B60W 50/045* (2013.01); *G05B 17/02* (2013.01); *G05B 23/0256* (2013.01)

(58) Field of Classification Search
CPC .. B60W 50/045; G05B 17/02; G05B 23/0256
See application file for complete search history.

(56) References Cited

U.S. PATENT DOCUMENTS

| | | | |
|---|---|---|---|
| 9,009,013 B2 * | 4/2015 | Krainz | G05B 17/02 703/13 |
| 2005/0119865 A1 | 6/2005 | Bartsch | |
| 2008/0183456 A1 | 7/2008 | Bruski et al. | |
| 2009/0300422 A1 | 12/2009 | Grichnik et al. | |
| 2013/0158741 A1 | 6/2013 | Hahne | |

FOREIGN PATENT DOCUMENTS

| | | |
|---|---|---|
| AT | 505326 | 12/2008 |
| DE | 102008027509 | 12/2009 |
| DE | 102011088805 | 6/2013 |
| DE | 102011088807 | 6/2013 |

OTHER PUBLICATIONS

English Abstract of DE102011088807.
English Abstract of DE102008027509.
English Abstract of AT505326.
English Abstract of DE102011088805.

* cited by examiner

*Primary Examiner* — Todd Melton
(74) *Attorney, Agent, or Firm* — Dykema Gossett PLLC

(57) ABSTRACT

A method for validating a driver assistance system (3) of a vehicle, wherein tests (T) defined by test parameters (P) are carried out for a predetermined test scenario (4), during a first test (T(n)) at least on test parameter (P) is determined, and to generate a second test (T(n+1)) the first test (T(n)) is altered in order to displace the first test parameter (P) within a critical range (7) assigned to it.

7 Claims, 2 Drawing Sheets

VIRTUAL TEST OPTIMIZATION FOR DRIVER ASSISTANCE SYSTEMS

This application is a U.S. national stage of PCT/EP2014/073797, filed 5 Nov. 2014, which claimed priority of Austrian Application A50729/2013, dated 5 Nov. 2013. All priorities are requested.

BACKGROUND OF THE INVENTION

Field of Invention

The present invention relates to a method for validating a driver assistance system of a vehicle in which tests defined by test parameters are carried out for a given test scenario.

The Prior Art

By now, driver assistance systems have found their way into nearly all vehicle classes, with the stated goal of greatly reducing accidents, or at least serious injuries and fatalities.

Present driver assistance systems are designed for specific driving situations, for example an Antilock Braking System (ABS) acts to prevent possible locking of the wheels. An Electronic Stability Control (ESC) counters possible swerving of the vehicle, Automatic Cruise Control (ACC) permits more relaxed highway driving when there are vehicles ahead, Brake Assist technology supports the driver during emergency braking, Lane Keep Assist Systems (LKAS) help the driver as the lane keep assistant to stay in his lane, for example on highways, and there are many other driver assistance systems known. Since in modern vehicles a driver assistance system is used alone only in the rarest of cases, for the newest vehicle generations, we speak of an advanced driver assistance system, thus a combination of several driver assistance systems.

In developing, testing and validating driver assistance systems, it is important while still in the development phase to consider as many situations or test scenarios as possible that require the intervention of a driver assistance system, in order to be able to test the desired intervention of the driver assistance system while still in the test phase.

Just as an example, there is the dense inner-city traffic, the complexity of which makes it nearly impossible to be able to consider all possible situations in the course of the test phase. Further, it must be kept in mind that intervention of a driver assistance system could lead to a new situation, which leads to interventions of a further driver assistance system. This can result in new traffic scenarios which were not considered or taken into account in the original test phase.

With regard to the creation of the most diverse test scenarios for testing and optimization of driver assistance systems, for example DE 10 2011 088 807 A1 shows a method in which, from a set test scenario, numerous further test scenarios can be generated by means of the Monte Carlo simulation, thus a stochastic method. For every scenario generated in this way, in each case a course with and a course without intervention of the driver assistance system is simulated. By comparing these two scenarios, it is possible to find a quantitative measurement for the effects of the intervention of the driver assistance system. For example, for each of the scenarios, an accident risk, a damage risk, or the like can be quantified.

One evident disadvantage is that a result of a simulated scenario has no effect on the simulation of a different scenario, and the scenarios are generated solely by the stochastic method. The data that result from a simulated scenario are therefore not used for improving, altering, or generating another scenario.

DE 10 2008 027 509 A1 shows a method that makes it possible to evaluate a driver assistance system with respect to its effectiveness while it is still in the planning phase. For this purpose, a simulation is carried out that is based on the measurement data of a real accident. At decisive points in the simulation, a sub-simulation is produced, which includes the intervention of a driver assistance system. This intervention can for example include activation of an automatic braking system with various delay times. The results or the outcome of the accident situation is stored as a simulation data set. With respect to the accident that serves as the basis, the data of which was used for the simulation, in this way for example the corresponding activation points for an automatic breaking system can be calculated for different delays that will result in avoidance of the accident. In this manner, a data bank of simulation data sets is created, which can be used for numerous driver assistance systems in order to obtain a prognosis of the effectiveness of the driver assistance system based on real data.

The disadvantage is that only the measurement data of accident situations that actually occurred are used. Scenarios for which no accident data are available, data of a driving situation which did not lead to loss of vehicle control, or from successfully prevented accidents or "near" accidents, are not used in this method. Therefore a set of measurement data that possibly could be entirely suited for generating further test scenarios is discarded. It is precisely the critical range between an accident prevented by a driver assistance system and an accident or loss of control that did occur that is the range which contains within itself the greatest possible potential for further development in testing of driver assistance systems. For the successful intervention of a driver assistance system, its function in this critical range is decisive.

It is therefore the object of this invention to make possible extensive testing and validation of a driver assistance system.

SUMMARY OF THE INVENTION

This object is achieved in that during a first test at least one test parameter is defined, and the first test is altered in order to generate a second test, in order to displace the test parameter within the critical range allocated to it. In this way it is ensured that, in particular, critical ranges within which a driver assistance system actively intervenes in the driving events are considered in the generation of further tests, and tests whose outcome was initially assessed as positive likewise are used for further examination. Critical ranges are here favorably bounded by an upper and a lower boundary for the test parameter. By consideration of these critical ranges and the targeted alteration of the test based on the specific test parameters, tests can also be generated possibly can reveal hidden defects in the driver assistance systems.

The test parameters may include for example the roadway width, curve radius or radius of curvature of a curve, vehicle speed, etc.

One advantageous embodiment proposes that the test parameter itself be altered so that it lies within a critical range. Thus a test parameter, for example the speed, can be directly altered, thus generating a new starting situation for a further test. Possible changes here would include increasing or reducing the test parameter.

Another advantageous embodiment proposes that the test parameter be dependent on further, second test parameters, and that these further, second test parameters be altered such that the test parameter lies within a critical range. The alteration of the second test parameter can likewise occur by means of an increase or decrease. This makes it possible to indirectly influence a first test parameter and in this way to identify possible relationships or the interaction of individual test parameters. Through indirect influence, interactions become identifiable, which again lead to new possible tests.

One advantageous embodiment proposes that in order to generate the second test, the first test be altered in such a way that the test parameter exceeds an allocated limit value. The test can be altered for example by increasing or decreasing first and/or second parameters. In this way the activation of a driver assistance system is deliberately provoked, which subsequently leads to a new course of the second test.

This makes it possible to accordingly enhance the meaningfulness of the second test, for example by bringing about a loss of control consciously or in a targeted manner, as the effect or the effectiveness of the subsequently activated driver assistance system will become evident.

A further advantageous embodiment proposes that the tests be carried out in a real-life driving test and or on the corresponding test stands with an at least partly real vehicle and/or entirely virtually. This allows a simple application of the method to the most diverse testing and examination facilities.

It is advantageously provided that the driver assistance system is formed from several driver assistance systems operating separately. As mentioned already in the introduction, this is the normal state of affairs in modern vehicles. If this circumstance is also considered in examination and validation of a driver assistance system, this makes it possible to identify and take into account the interaction of various systems or their mutual influence.

A likewise advantageous embodiment proposes that the driver assistance system have real or virtual sensor data available, that the driver assistance system calculate test parameters from the sensor data, from which an internal driving situation is created, and that the internal driving situation is compared with the real or virtual driving situation. If the sensor data are wrongly processed or calculated by the driver assistance system, a specific difference will arise between the test parameters calculated for the internal driving situation and their actual values, which describe the driving situation. This makes possible early identification of objects that are not classified or are classified incorrectly by the driver assistance system. In this way, possibly hidden errors in the driver assistance system which relates to perception of the environment are already identified in the development phase.

BRIEF DESCRIPTION OF THE DRAWINGS

The present invention is described in more detail below with reference to FIGS. 1 to 3, which show exemplary, schematic, and non-limiting advantageous embodiments of the invention. Here.

DETAILED DESCRIPTION

Figure 1:
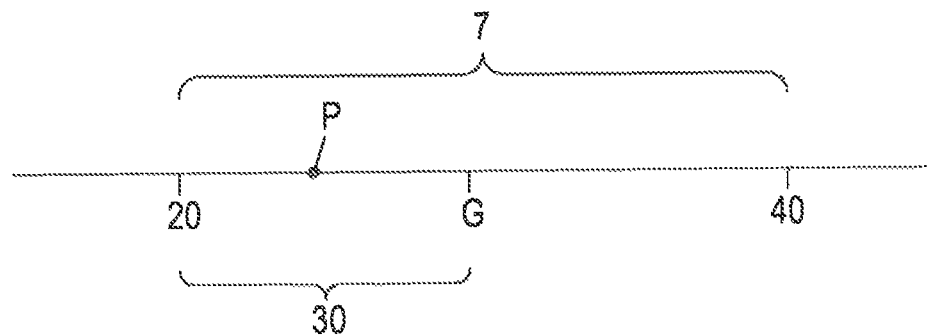
FIG. 1 shows the relationship between critical range, limit value, and position of a test parameter.

Below, in order to describe the method according to the invention, a number of terms are used, which are explained beforehand.

Test scenario 4 is understood to mean a specific framework stipulation/environment, for example negotiating a curve in a motor vehicle. Other test scenarios 4 could be, for example, driving on ascents or descents, straight-ahead driving with an obstacle or other road users in the roadway, wherein a number of other test scenarios 4 are also conceivable.

All physical and dynamic indicators are designated as test parameters P. The test parameters P comprise for example the width of the roadway and the radius of curvature of a curve, lane characteristics such as road grip and friction values, roadway temperature, humidity of the air, wind intensity and direction, the speed with which the vehicle negotiates the curve, the lateral acceleration of the vehicle, the slip of the tires (possibly in each individual tire), the size of an obstacle and its location, where and how fast other road users are traveling, etc. Basically it should be kept in mind that the increase or decrease of a test parameter P, depending on its property, can produce different effects. For example, an increase in the speed is more likely to lead to a loss of control/accident, an increase in road grip on the other hand raises the controllability of the vehicle. If reference is made below to the increase or decrease of a test parameter P, this means that change in the test parameter P that makes it possible to displace its critical range 7, which is described in more detail below.

The test T(n) is formed from the combination of the test scenario 4 and the test parameter P. The test T(n) thus contains where (test scenario 4) a vehicle should be moving under what conditions (test parameter P). One test T(n) could be negotiation of a curve at low speed on a dry roadway. Another test T(n+1) could be negotiation of the same curve at a substantially higher speed, with a side wind and patchy ice on the roadway. A new test T(m) uses a new test scenario 4 and contains, for example, straight driving, downhill on a wet roadway. The test T(n) can be carried either in real life, with a vehicle on a test course, a vehicle on a rolling test stand with virtual surroundings, or entirely virtually, in the form of a simulation, with mixed forms also conceivable. In a real-life test, both above-described test parameters P are obtained from the driver assistance system 3 in a known manner via the corresponding sensors. If the environment is virtually simulated, the sensor data are simulated accordingly. From this real or simulated sensor data, the driver assistance system 3 calculates the test parameters P. For example, if the driver assistance system 3 is assigned an instantaneous velocity by means of real or simulated sensor data, the driver assistance system 3 calculates a corresponding acceleration or deceleration from its change over time. In this manner, therefore, tester parameters P are also calculated by the driver assistance system 3. If one of the above-mentioned mixed forms is used, test parameters P are also accordingly calculated and/or made available.

A driver assistance system 3 of a vehicle, as already referred to in the introduction, has the object of reducing accidents or at least serious injuries. A driver assistance system 3 intervenes actively, without action by the driver, in the driving event, in order to avoid accidents and above all injury to persons to the extent possible. A combination of a number of driving assistants, for example an Antilock Braking System (ABS)+Electronic Stability Control (ESC)+Traction Control System (TCS)+Lane Keep Assistance System (LKAS) may be viewed as a driver assistance system. These possible combinations of various driving assistants are designated below as driver assistance system 3.

Many test parameters P, such as for example the roadway width or the curve or radius of curvature of a curve, can be freely selected and do not change during the test T(n). These include the test parameters P that are necessary to more precisely define the test scenario 4 for the test T(n), for example the indication of the curve radius, when negotiation of a curve is chosen as the test scenario 4. Test parameters P such as the vehicle speed, for example, are first freely predetermined, but can change in the course of the test T(n), as for example when a driver assistance system 3 reduces the speed.

So it is reasonable that the test parameters P do not necessarily have to be predetermined. They can also arise as a consequence of the most diverse relationships or change during the test T(n). If the vehicle starts to skid, for example, during the test T(n), the lateral acceleration of the vehicle changes, although this initially was unspecified or not predetermined. Many test parameters P cannot be "directly" selected, but only indirectly influenced, such as slip, for example, which among other things is dependent on the drive torque of the vehicle and friction between the wheels and the roadway surface. In addition, as already mentioned in the example of speed, test parameters P are continuously changed during the test through the intervention of a driver assistance system 3.

In this regard, driving situation 5 is mentioned. The driving situation 5 comprises that condition, that position of the vehicle, which is set during the test T(n). It arises from the test parameters P that are predetermined or arise during the test T(n). This driving situation 5, as already stated, can be marked for example by a higher lateral acceleration than was established previously as test parameter P. Such a driving situation 5 could be set in the test T(n), which comprises the negotiation of a curve at high speed, a side wind, and icy roadway, as the vehicle skids.

The range between controlled driving behavior and an undesired driving situation 5 may be deemed a critical range 7 of a test parameter P. For example, a driving behavior in which the intervention of a driver assistance system 3 is unnecessary may be viewed as controlled driving behavior. For example, contact with another vehicle, a curbstone, etc., or even the partial or total loss of control may be termed an undesired driving situation 5. The critical range 7 is bounded by a lower limit 20 and an upper limit 40 for the test parameter P. Below the lower limit 20 of the critical range 7, the driving behavior is controlled, and activation of a driver assistance system 3 is not necessary. Above the upper limit 40, however, a driver assistance system 3 is already activated, but the avoidance of an undesired driving situation 5 or an accident, or the recovery of control is no longer possible.

Between the lower limit 20 and the upper limit 40 lies said critical range 7, within which there may be a loss of control, a driver assistance system 3 can be activated, and through the assistance of the driver assistance system 3, control can be restored.

The test parameter P is thus a critical range 7 in the form of a lower limit 20 and an upper limit 40, within which a driving situation 5 usually occurs that can require the intervention of a driver assistance system 3, for example a certain magnitude of forces acting on one of the tires, which can lead to the loss of road grip. These critical ranges 7 or their lower limits 20 and upper limit 40 can be predetermined through fixed values, characteristic curves, characteristic maps and the like for the individual test parameters P, or even chosen freely.

The critical range 7 of a test parameter P however is not necessarily coupled to activation of the driver assistance system 3. Certainly a test parameter P can lie in its critical range without the driver assistance system 3 being activated. The activation of the driver assistance system 3 is coupled to the limit value G of a test parameter P, which lies within the critical range 7.

That value which when reached or exceeded activates the driver assistance system 3 for provision of assistance is viewed as the limit value G of a test parameter P. The limit value G is determined by the driver assistance system 3 using diagrams, characteristic maps, calculation formulas and the like, which are based for example on already known driving situations, but as described below, can also vary during the test T(n). This limit value G lies within the critical range 7. The position of the limit value G depends on the test parameter P that is selected and/or established during a test T(n) and can therefore also change in the course of a test T(n). For example an Automatic Cruise Control (ACC) ensures that in stop-and-go traffic, driving with a constant separation from the vehicle in front can be assured. The limit value G at which an automatic braking system is activated depends first of all on the separation and speed at which both vehicles are moving. If a suddenly increased slip is identified in one of the vehicle wheels, the driver assistance system 3 proceeds on the basis of altered roadway conditions, and the limit value G at which an automatic braking system is activated is accordingly reduced, in order to be able, even with a "slick" roadway, to avoid a rear-end collision.

Through the interaction of the individual test parameters P with one another, therefore, not only the test parameters P themselves, but also their limit values G can be influenced. It is true that these relationships can be illustrated in characteristic maps, but it can be assumed that not all relationships can be fully apprehended for the driver assistance system 3.

The limit value G does not necessarily lie on the lower limit 20 of the critical range 7, so that a driver assistance system is activated as soon as a test parameter P enters the critical range. For example, it is conceivable that the limit value G for the test parameter P "slip" lies at the center of its allocated critical range 7. The slip can therefore assume values during the test T(n) which do lie within its critical range, but due to which its limit value G is still not exceeded, and therefore a driver assistance system 3, such as a Traction Control System (TCS), for example, is not yet activated to assist. Regarding the position of the limit value G within the critical range 7, therefore, a certain tolerance 30 is defined, which is used to select the extent to which a test parameter P is indeed critical, but assistance by a driver assistance system 3 is "still" not necessary.

FIG. 1 shows the relationship between the critical range 7, its lower limit 20 and upper limit 40, tolerance 30, limit value G, and position of test parameter P. This shows an "instantaneous view," since as already stated, the position of a test parameter P and the position of the affiliated limit value G can change constantly over the course of the test T(n). For example, the position of the limit value G, is first selected in the center of the critical range 7 by means of the driver assistance system 3 using diagrams, characteristic maps, calculation formulas, and the like, which are based for example on already known driving situations, wherein every other position of the limit value G can also be selected by the driver assistance system 3. The closer the limit value G to the lower limit 20 of the critical range 7, the lower the tolerance 30. Within the tolerance 30, a test parameter P may be critical, but a driver assistance system 3 is "still" not activated, and no assistance is provided. For example, the test parameter P is located precisely within this range. In this case, if one takes as the test parameter P the slip of one of the wheels of the vehicle, the position of the test parameter P within the tolerance 30 means that a certain slip is already present, but this is so slight that assistance by the driver assistance system 3 is still not necessary.

Figure 2:
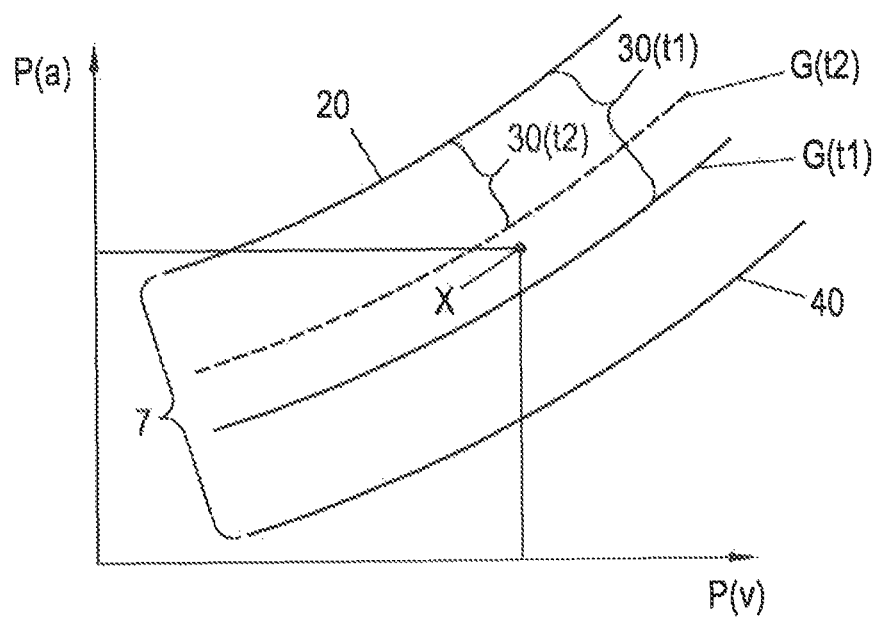
FIG. 2 shows the relationship between critical range, position of the test parameter, and a changing limit value.

FIG. 2 again shows the relationship in the form of a characteristic map between the critical range 7, its lower limit 20 and upper limit 40, and the limit value G for two test parameters P, which are dependent on one another, wherein, the possibility of the displacement of the limit value G within a test T(n) at two different times t1 and t2 is shown. For example, the test parameter P(v) constitutes the speed of a first vehicle and the test parameter P(a) the separation from a second vehicle in front of it. The relationship between the two test parameters P(v) and P(a) is designated by the point X in the characteristic map. The higher the speed of the first vehicle, i.e. the test parameter P(v), the greater the separation, i.e. the test parameter P(a) has to be, from the second vehicle traveling ahead, so that point X does not enter the critical range 7 or exceed the limit value G. At a first point in time t1, the point X is in the critical range 7, but the limit value G(t1) is not yet exceeded, and a driver assistance system 3 such as an automatic breaking system, is thus not activated. At another point in time t2, the speed of the first vehicle, thus the test parameter P(v), and the separation from the second vehicle traveling ahead, thus the test parameter P(a), do not change and the position of point X remains the same. Since the roadway conditions at the point where the first vehicle was located at the time t2 differ from the roadway conditions at the point where the first vehicle was located at the time t1, for example due to deterioration of the roadway conditions as a result of moisture, the position of the limit value G(t2) will also differ from the position of the original limit value G(t1). Point X therefore exceeds the limit value G(t2) and the driver assistance system 3 is activated. This again illustrates that the interaction of the individual test parameters P can influence not only the test parameters P themselves, but also the limit values G.

Figure 3:
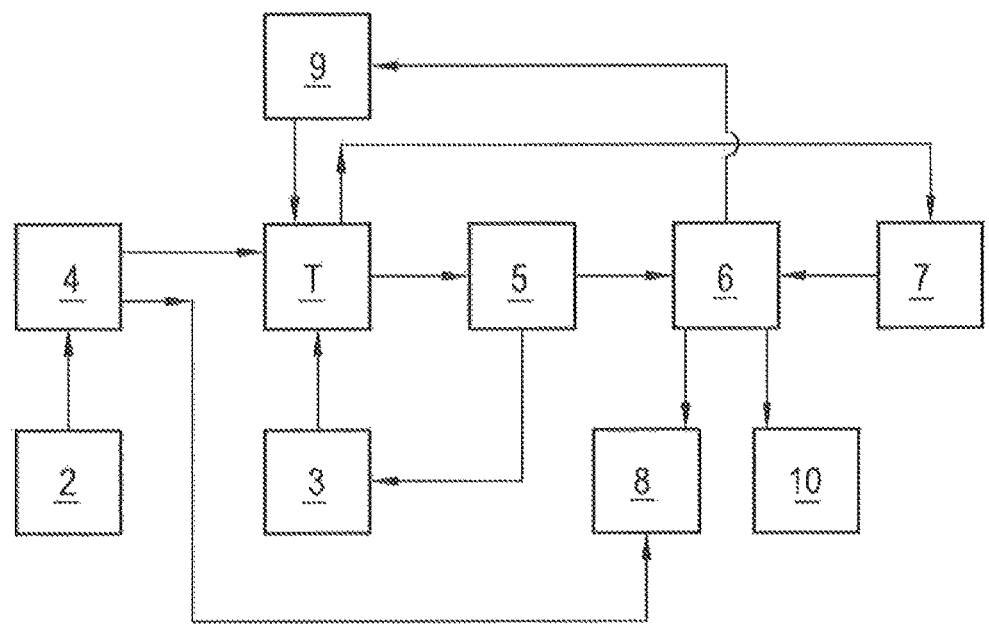
FIG. 3 shows a schematic view of the method for validating a driver assistance system.

FIG. 3 shows the diagram of the method according to the invention for testing and validating a driver assistance system 3 of a vehicle. A data bank 2 for example stores various framework conditions/environments (test scenarios 4). From the data bank 2 an environment is taken as the test scenario 4. Based on the test scenario 4, a test T(n) is carried out, in which at first either no intervention of a driver assistance system 3 is necessary, or the driver assistance system 3 to be tested provides assistance to the vehicle according to its task. The test T(n) is defined by the above-described test parameters P, such as, for example, speed, road grip, separation from the shoulder, etc., in combination with the test scenario 4.

So, in a real-life test, the driving situation 5 in which the vehicle is moving, thus the test parameters that are predetermined or arise during the test T(n), is obtained by the driver assistance system 3 as already described via the corresponding sensors. If the environment is virtually simulated, the accordingly simulated sensor data or the test parameters P are made available to the driver assistance system 3. The driving situation 5 can thus comprise real-life sensor data and/or virtually generated data. Based on driving situation 5, the corresponding measures can be taken to support the vehicle by the driver assistance system 3, should this be necessary in the scope of the test T(n). Through these measures, the test T(n) is accordingly influenced in its course or the test parameter P altered.

If the test T(n) is carried out for the test scenario 4, a certain driving situation 5 arises, which as already stated, is defined by the test parameters P selected or arising during the test T(n). During the test T(n), the test parameters P are determined; in a real-life test T(n) for example read from a control device or from sensors. An assessment 6 of the test parameters P is made with reference to the critical ranges 7 belonging to the test parameters P.

The comparison of the test parameters P, which arise through the driving situation 5 during the test T(n), with the critical ranges 7 allocated to them, is understood to be the assessment 6. The assessment 6 can arise for example in that a test parameter P remains below its critical range 7 during the test T(n), and thus has also not reached its limit value G, and therefore the driver assistance system 3 has not be actuated. The result of the assessment 6 thus includes what "positions" the test parameters P have assumed inside or outside the critical range 7 with respect to its lower limit 20, upper limit 40, and limit value G during the test T(n). In the course of the test T(n), if it is detected that the upper limit 40 of a critical range 7 has been exceeded, and if the result has been a loss of control, swerving into the oncoming lane, collision with another vehicle, or some other undesired driving situation 5, the test T(n) is deemed as "failed" for the test scenario 4.

Basically, a driver assistance system 3 should make it possible to avoid a loss of control, an accident, a collision with other vehicles or objects, etc. However, if the Test T(n) has not been passed, there could possibly be an error in the driver assistance system 3, or at least the potential for improvement and/or further development of the driver assistance system 3. In order to be able to analyze the grounds for the "failure" of the driver assistance system 3, all test parameters P that were selected and/or that arose/were set during the test T(n) and, in order to be able to better identify the relationships, also the test scenario 4, undergo an analysis 8, by which possible errors and/or weak points in the driver assistance system 3 can be identified.

If the test T(n) concludes in a form such that, for example, none of the test parameters P entered the critical region 7, or at least one of the test parameters P entered its critical range 7, but did not exceed its limit value G, all test parameters P after theft assessment 6 are stored in a results data bank 10. Even if a test parameter P has exceeded its limit value G, but the driver assistance system 3 has supportively and successfully intervened, and thus the corresponding lane-keeping, timely slowing to a stop, etc., were implemented, all of the test parameters P are stored in a results data bank 10 after theft assessment. There the test parameters continue to remain available for possible later analyses, for documentation, or as the basis for further developments or the like.

Further, in these cases the test parameters P, after their assessment 6, are used for a modification 9. Using this, the modified test T(n+1) is formed, which works with the same original test scenario 4 that was also used for the test T(n), except that an arbitrary test parameter P, which in the course of the test T(n) lay below the lower limit 20 or even within its critical range 7, in the test T(n+1) with high probability lies within its critical range 7, or even exceeds its limit value G.

In addition, as already mentioned, some or even several test parameters P can be directly altered. As likewise already mentioned, however, there is also the possibility that a first test parameter P depends on a further, second test parameter P'. In order to ensure with high probability that the first test parameter P lies within its critical range 7, also these, even these several second test parameters P', which influence the first test parameter P, can accordingly be altered, possibly directly. The process of the modification 9 is carried out in that, for example, the mentioned first test parameter P, if possible directly, or that second test parameter P' on which it depends, is gradually and iteratively altered. Here, as already mentioned for the first test parameter P, an increase or decrease of the second test parameters(s) P' comes under consideration. Iteratively in this context means that between the individual tests T(n), T(n1), T(n+2) ... a modification 9 is made in each case and thus the test parameters P and P' are gradually displaced. Here however it need not be the first test parameter P that is altered by the modification 9.

Because the process occurs iteratively, the modification 9 preferably is applied to those test parameters P that in the test T(n) did lie within their critical range 7, but did not exceed their limit value G. Since said test parameter P is already located in the critical range 7, possibly it would take only a slight modification 9 to exceed its limit value G. Here it should be kept in mind, however, that assured exceeding or even exact attainment of the limit value G cannot be predicted, since as already explained, owing to multifaceted relationships between the test parameters, their limit values G can also be displaced, or may not yet be known.

The new test T(n+1) formed in this way therefore preferably corresponds to a test T(n) in which a test parameter P, which has not exceeded its limit value G in the test T(n), now exceeds its limit value G, and thus lies in the range between controlled driving behavior and loss of control, where a driver assistance system 3 provides active assistance. This is exactly the range which, in testing of the driver assistance system 3, has the greatest possible potential for further development. Here it can be seen whether the driver assistance system 3 to this extent can intervene with assistance, so that even in the test T(n+1), in which the driver assistance system with high probability is tested in the critical range, there is no loss of control or accident, and no undesired driving situation 5, and the test T(n+1) is thus passed. With "high probability" therefore, because the displacement of the test parameter(s) P, as already described, can proceed iteratively, and it cannot necessarily be assured whether a said test parameter P actually lies within its critical range 7, or even reaches or exceeds its limit value G. Should the corresponding test parameter P not reach or exceed its limit value, a new test T(n+1) is carried out, in which possibly other test parameters P reach or exceed their limit value.

If it is still not possible, despite intervention of the driver assistance system 3, to pass the test T(n+1) based on a test scenario 4, as already described an analysis 8 is carried out, since possibly a weak point was found in the driver assistance system 3. The analysis 8 can subsequently trigger the elimination of errors that have appeared while still in the development phase of the driver assistance system 3.

The described modification 9 of the test T(n) can of course be carried out at optionally frequent or prolonged periods, for which reason the corresponding stop criteria, such as for example a maximal number of modifications 9 of a test T(n) or a maximal test period, can be provided. If the said stop criterion is fulfilled, an additional environment stored in the data bank 2 can be used as a new test scenario 4, and a new test T(m) carried out. Also for the test T(m), again modifications of test parameters P are carried, and thus further tests T(m+1), T(m+2) ... are formed.

Figure 4:
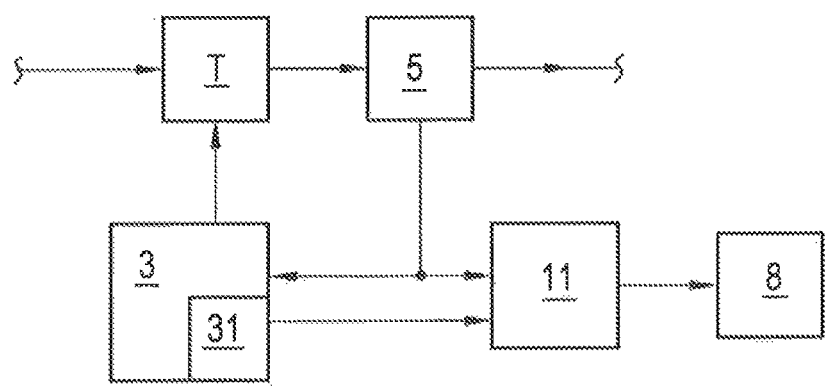
FIG. 4 shows a section from the schematic view shown in FIG. 3 with an advantageous addition.

FIG. 4 shows a section from the program shown in FIG. 3 with an advantageous supplement. As already described, in a real-life test the driving situation 5 in which the vehicle is moving is obtained in a known manner via the corresponding sensors. If the environment is virtually simulated, accordingly simulated sensor data are made available to the driver assistance system 3. From this real or simulated sensor data, test parameters P are calculated by the driver assistance system 3, or an internal driving situation 31 is generated, which is based on the sum of the data made available to the driver assistance system 3.

If a driver assistance system 3 through its assistance cannot prevent an undesired driving situation 5, such as a collision for example, or if the driver assistance system 3 did not intervene despite the need, or was not activated, there is a possible error source in that the driving situation 5 is "wrongly assessed" by the driver assistance system 3. This would suggest that the internal driving situation 31 does not correspond to the actual or simulated driving situation 5. The basis for this could be, for example, that sensor data is wrongly processed by the driver assistance system 3. This produces a certain difference between the test parameters P calculated for the internal driving situation 31, and their actual values, which describe the driving situation 5.

In order to detect such possible errors, as shown in FIG. 3, the internal driving situation 31 and the real or simulated driving situation 5 undergo a comparison 11. If the comparison 11, as described above, shows a difference between the internal driving situation 31 and the actual or simulated driving situation 5 and if this difference exceeds an allowable, freely selectable value, the result of the comparison 1 undergoes an analysis 8. In this way, again possible errors and/or weak points of the driver assistance system 3 can be identified, and they can be eliminated while still in the development phase of the driver assistance system 3.

The invention claimed is:

1. A method for validating a driver assistance system (3) of a vehicle, wherein for a predetermined test scenario (4), tests (T) defined by test parameters (P) are carried out, wherein during a first test (T(n)), at least one test parameter (P) is determined, and to generate a second test (T(n+1)), the first test (T(n)) is altered in such a way as to displace the test parameter (P) with a critical range (7) assigned to it, within which a driver assistance system actively intervenes in a driving event, and for the predetermined test scenario (4), the second test (T(n+1)) is carried out in order to validate the driver assistance system (3).

2. The method according to claim 1, wherein the test parameter (P) is itself altered, so that it lies within a critical range (7).

3. The method according to claim 1, wherein the test parameter (P) is dependent on further test parameters (P'), and wherein these further test parameters (P') are altered such that the test parameter (P) lies within a critical range (7).

4. The method according to claim 1, wherein to generate the second test (T(n+1)), the first test (T(n)) is altered such that the test parameter (P) exceeds a limit value (G) such that when it is reached or exceeded, the drive assistance system (3) is activated to provide assistance.

5. The method according to claim 1, wherein the tests (T) are carried out in a real-life driving test and/or on the corresponding test stands with an at least partially real vehicle and/or also entirely virtually.

6. The method according to claim 1, wherein the driver assistance system (3) is formed from a number of individual functioning driver assistance systems.

7. The method according to claim 1, wherein real or virtual sensor data are made available to the driver assistance system (3), and that the driver assistance system (3) calculates the test parameters (P) from the sensor data, generates an internal driving situation (31) from that, and the internal driving situation (31) is compared with the real or virtual driving situation (5).

* * * * *